United States Patent

Wang

Patent Number: 5,457,745
Date of Patent: Oct. 10, 1995

[54] ADJUSTABLE MOBILE PHONE HOLDER

[76] Inventor: Chin-Yang Wang, No. 167, Lane 131, Sec. 2, Ture Hsing Rd., Panchiao City, Taipei Hsien, Taiwan

[21] Appl. No.: 273,344

[22] Filed: Jul. 11, 1994

[51] Int. Cl.[6] .................................................. H04M 1/00
[52] U.S. Cl. .......................... 379/454; 379/446; 379/455; 379/426
[58] Field of Search .................................. 379/426, 428, 379/446, 454, 455, 449; 455/89, 90; 248/316.4, 231.4; 24/524, 523, 527

[56] References Cited

U.S. PATENT DOCUMENTS

| | | | |
|---|---|---|---|
| 5,187,744 | 2/1993 | Richter | 379/455 |
| 5,222,132 | 6/1993 | Rioux, Jr. | 379/455 |
| 5,305,381 | 4/1994 | Wang et al. | 379/455 |

*Primary Examiner*—Jeffery A. Hofsass
*Assistant Examiner*—Jack Chiang
*Attorney, Agent, or Firm*—Bucknam and Archer

[57] ABSTRACT

Disclosed is an adjustable mobile phone holder comprising a lower housing, an upper housing, a left plate combination, a right plate combination, and a slide block. The lower housing matches with the upper housing; left and right left plate combinations are movably inserted into respective channels on the upper housing for adjustment in width; two insert plates are movably put into respective vertical plates of the left and right plate combinations for adjustment in height; and the slide block is movably into the upper housing for adjustment in length.

9 Claims, 4 Drawing Sheets

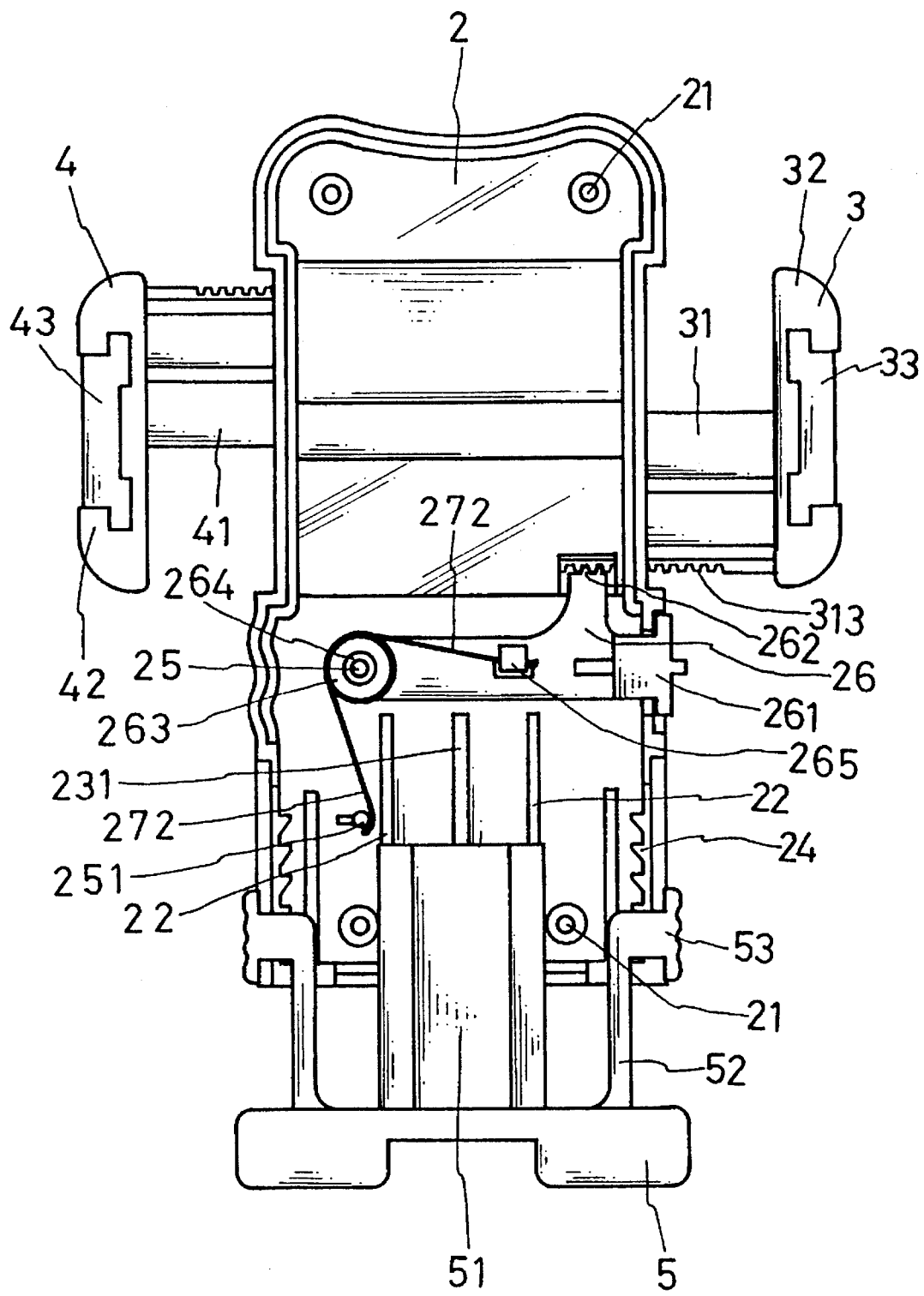
F I G. 2

5,457,745

ADJUSTABLE MOBILE PHONE HOLDER

BACKGROUND OF THE INVENTION

The present invention relates to a mobile phone holder which is adjustable in thickness, width and length.

Mobile phone has become a necessary means of communications in today's industrial and commercial society, with which it can send and receive the message without day, thus helping us get latest information at any time. In addition, due to the popularity of mobile phones, we would take control of the timing in any appointment or business negotiation, and never lose any business opportunity just because of unavailability to contact in case of any unexpected event, for example, a traffic jam.

However, mobile phones now found in the market are different in size. It often causes problems in carrying and using them, especially when in the car. As there is no device to hold a mobile phone in the car, it is usually put at a place near the driver. By this way, it is not convenient for the driver to take, and there is also the possibility to get the mobile phone fallen down or hit during driving on rough road or in turning the direction, thus causing damage to the mobile phone.

SUMMARY DESCRIPTION OF THE INVENTION

The present invention has been accomplished under the aforesaid circumstances. It is therefore the object of the present invention to provide a mobile phone holder which is adjustable in thickness, width and length, so that it can accommodate various types of mobile phones in different sizes, and firmly keep them in place.

BRIEF DESCRIPTION OF THE DRAWINGS

FIG. 2 is a bottom view showing in part the internal structure of the present invention;

DETAILED DESCRIPTION OF THE PREFERRED EMBODIMENT

Figure 1:
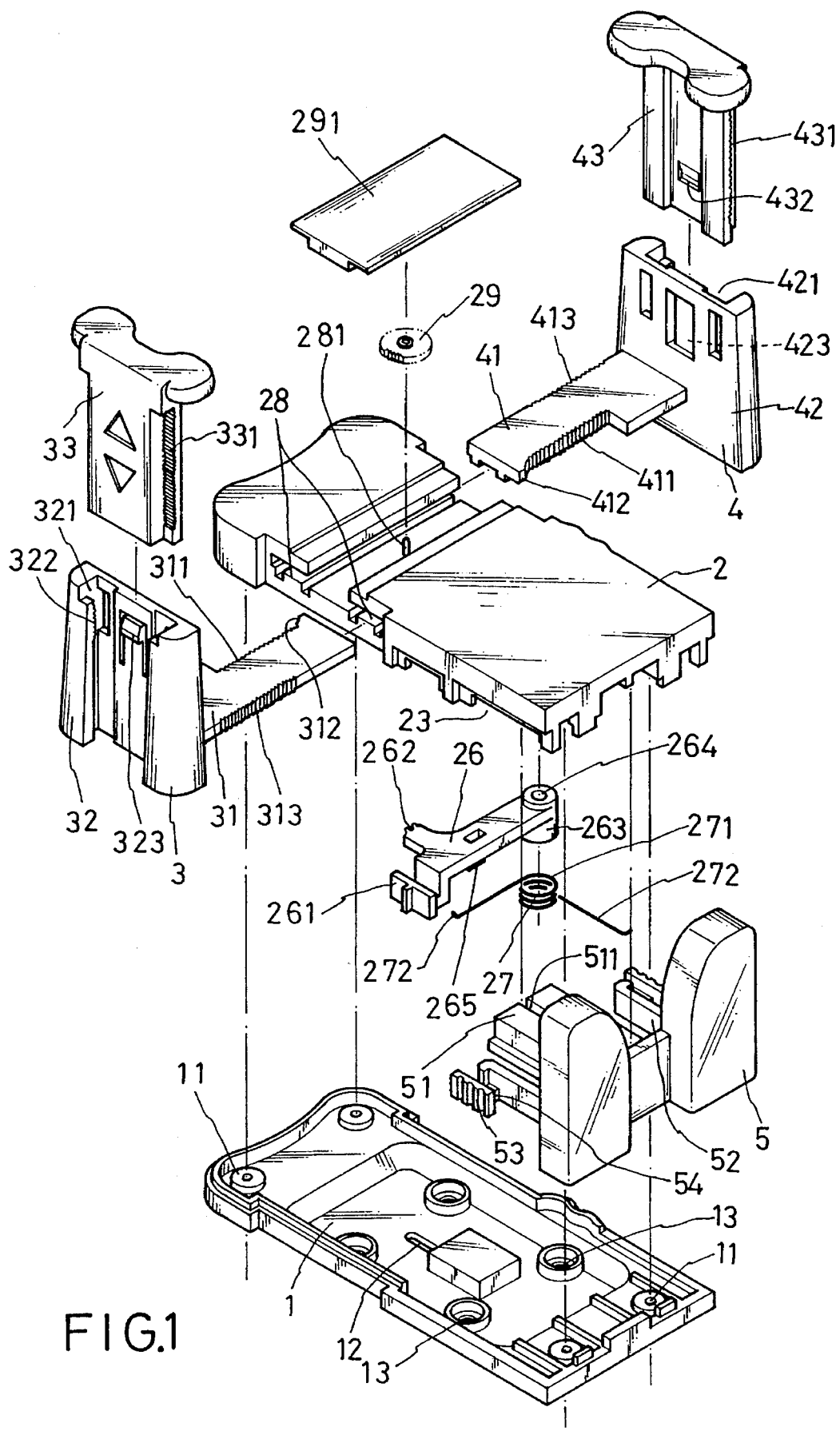
FIG. 1 is an exploded view of an adjustable mobile phone holder according to the present invention.

Referring to FIG. 1, an adjustable mobile phone holder in accordance with the present invention is generally comprised of a lower housing 1, an upper housing 2, a left plate combination 3, a right plate combination 4 and a slide block 5.

The lower housing 1 comprises a plurality of screw holes 11, a slot 12 at the center for insertion therethrough of an external stand (not shown), and a plurality of larger screw holes 13 in diameter for connecting to respective screw holes on a platform of the external stand by screws (this mechanism is well known in the art, no more details will be described herein).

Referring to FIG. 2, the upper housing 2 matches with the lower housing 1, comprising on the back a plurality of screw holes 21 corresponding to the plurality of screw holes 11 on the lower housing 1 for connecting together by screws, two guide blocks 22 longitudinally inwards extended a length of distance over the underside from one end, and a rib 231 disposed between the two guide blocks 22. Each guide block 23 has an opening 23 cut from and along a portion of its outer wall, and an one-way toothed portion on the lower inner side of the opening 23. The upper housing 2 has a pivot pin 25 and a stop pin 251 on the underside. A catch means 26 is provided with a catch knob 261 at one end, a toothed catch 262 on one side, a stop catch 265 on the underside, and a round head 263 at the opposite end to the catch knob 261, which round head 263 has a center thru-hole 264 for insertion therein of the pivot pin 25, such that the catch means 26 can rotate about the pivot pin 25. A torsion spring 272 is comprised of two legs 272 and a coil portion 271, with one leg 271 hooked up to the stop pin 251, another leg 272 hooked up to the stop catch 251, and the coil portion 271 attached to the pivot pin 263. The upper housing 2 further comprises two channels 28 on the top side, and a shank 281 upstanding between the two channels for attaching to a knurl 29 to be covered by a cover plate 291.

The left plate combination 3 comprises a horizontal plate 31 and a vertical plate 32 being perpendicular thereto. The horizontal plate 31 has a first toothed section 311 on the inner side for engagement with the knurl 29, a tip 312 at the front end adjacent to the first toothed section 311 for contacting to rotate the knurl 29 and acting as a stop to limit such rotational movement, and a second toothed section 313 on the opposite side to the first toothed section 311 for engagement with the toothed catch 262. The vertical plate 32 has two channels 321 on the opposite sides for insertion therein of an insert plate 33. Each channel 321 is provided with a toothed section 322 on the upper end. A tongue 323 is located between the two channels 321. The insert plate 33 is made having a toothed section 322 on either side for engagement with respective toothed section 322 of the vertical plate 32, and a groove 332 for joint with the tongue 323 to limit the upward movement of the insert plate 33.

The right plate combination 4 is designed to be exactly same as the left plate combination 3, but operates in the opposite direction. All its parts corresponding to those in the left plate combination 3 are referenced by the same numerals, with the only exception that their foremost number "3" is replaced with "4".

The slide block 5 has a base 51 disposed between two prongs 52. The base 51 is provided with a groove 511 in the middle for insertion therein of the rib 231, so that the base 51 is movable between on the guide blocks 22 along the rib 231. Each prong 52 comprises a push button 52 extended outwards from the front end and connected thereto by a toothed member 54 for engagement with respective toothed portions 24. When the push buttons 53 are simultaneously pressed, the prongs 52 are forced to bent inward, making the toothed members 54 disengaged from respective toothed portions 24, thus enabling the slide block 5 to move freely. As soon as the push buttons 53 are released, the toothed members 52 engage with respective toothed portions 24 again to hold the slide assembly 5 in place.

Upon assembling, the left and right plate combinations 3, 4 are inserted into respective channels 28 from either side, having the first toothed sections 311, 411 respectively engaged with the knurl 29, and the insert plates 33, 43 put into respective channels 321, 421. The slide block 3 has the base 51 move in the upper housing 2 between the guide blocks 22. Then, the catch means 26 is attached to the pivot pin 25, and the torsion spring 27 is attached to the round head 263 by the coil portion 271, having the legs 272 respectively hooked up to the stop pin 251 and the catch stop 265. At this point, the catch knob 261 is located at one side of the upper housing 2, and the toothed catch 262 engages with the second toothed section 313. Finally, the lower housing 1 is matched with the upper housing 1 to complete the assembly as shown in FIG. 3.

Figure 3:
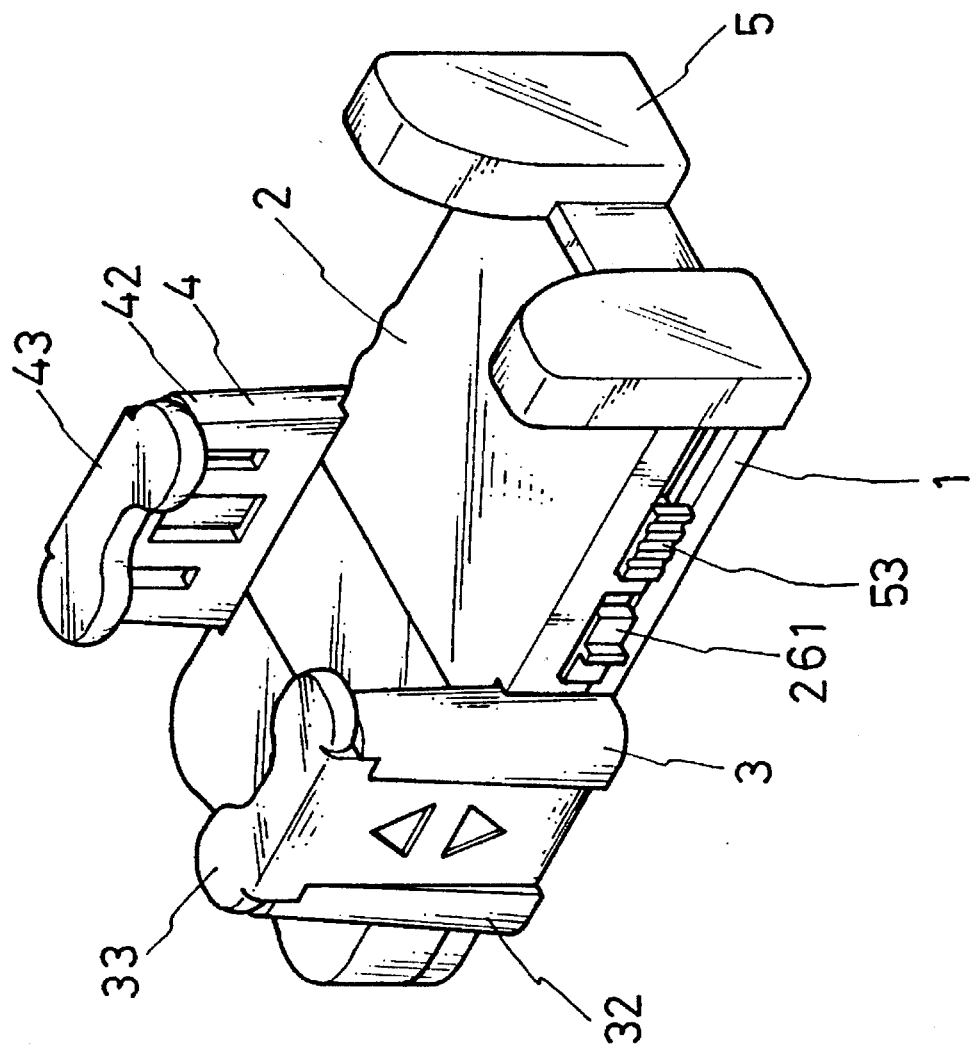
FIG. 3 is a perspective assembly view of the adjustable mobile phone holder of FIG. 1.

Referring to FIGS. 2 and 3, when assembled, the insert plates 33, 34 may be pulled upward and then held in place by engaging the toothed sections 331, 431 respectively with the toothed sections 322, 422 for accommodating various kinds of mobile phones in different thicknesses. After operating the catch knob 261 to disengage the toothed catch 262 from the second toothed section 313, the horizontal plate 31 or the first toothed section 311 may be displaced horizontally by the operation of left plate combination 3, driving the knurl 29 to rotate, thereby driving the first toothed section 411 to move, so as to make the right plate combination 4 to do a synchronous horizontal movement. Similarly, if the right plate combination 4 is operated, it also can drive the left plate combination 3 to move horizontally, so as to make available an adjustment in width. When such an adjustment is made, the catch knob 261 may be released to let the toothed catch 262 engage with the second toothed section 313 formed on the left plate combination 3 at one side again for positioning.

In addition, if the push knobs 53 are simultaneously pressed to force respective prongs 52 to be bent inward, making the toothed members 54 disengaged from respective toothed sections 24, such that the slide block 5 may be pulled out to obtain an adjustment in length. Then, if the pushed knobs 53 are pressed again to disengage the toothed members 54 from respective toothed sections 24, the slide block 5 may be pushed back to its original place.

Figure 4:
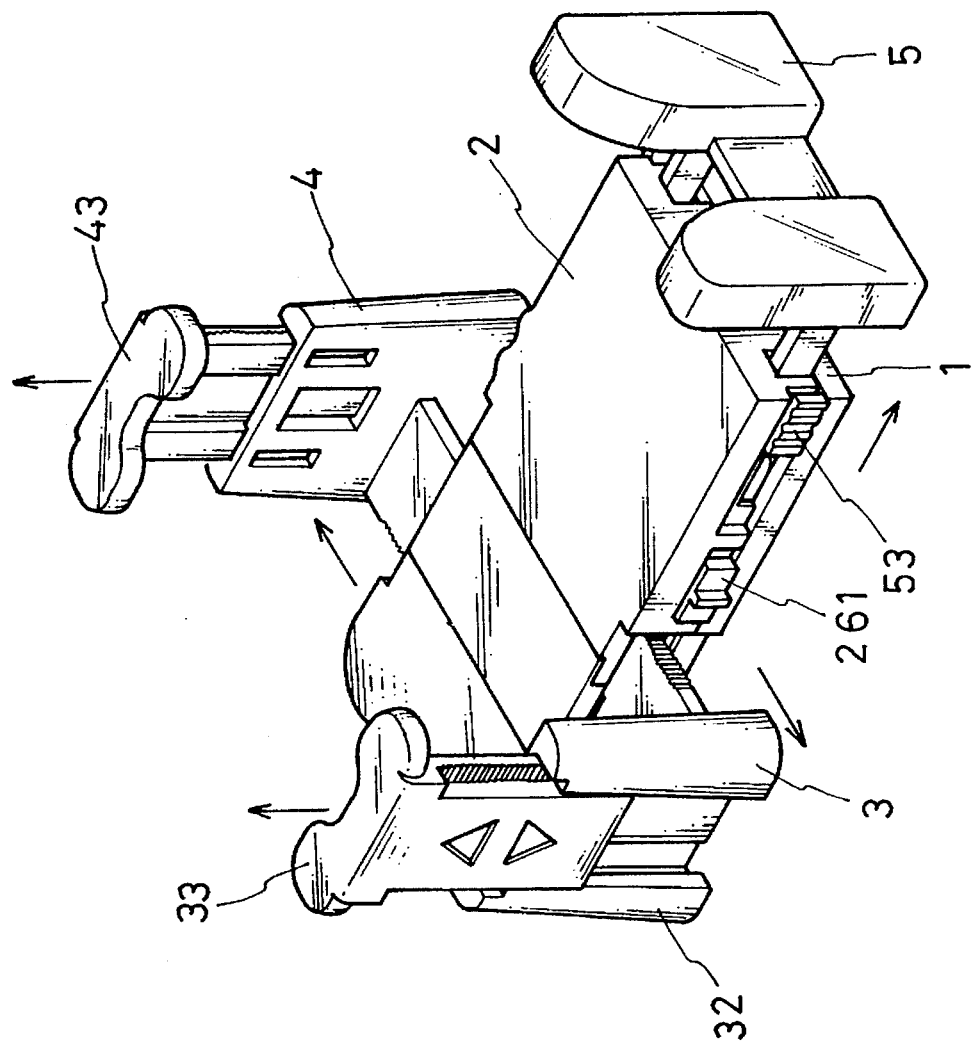
FIG. 4 is an applied view of the present invention.

Referring to FIG. 4, an adjustable mobile phone holder in accordance with the present invention is illustrated to make available a variety of adjustments in thickness, width and length, so as to accommodate itself to various mobile phones in different dimensions as found in the market now.

While only one embodiment of the present invention has been shown and described, it is understood that various changes and modifications could be made without departing from the spirit and scope of the claims.

What is claimed is:

1. An adjustable mobile phone holder comprising:

a lower housing having thereon a plurality of screw holes;

an upper housing matched with said lower housing, said upper housing having an underside and a top side, a plurality of screw holes on the underside for connecting to said plurality of screw holes on said lower housing by screws;

two guide blocks longitudinally inward extended a length of distance over the underside of the upper housing, an opening cut from and along a portion of an outer wall of each of the guide blocks respectively, a one-way toothed portion formed on a lower inner side of each of said openings, a rib disposed between said two guide blocks;

a pivot pin on the underside for mounting thereon of a catch means;

said catch means comprising a catch knob at one end, a toothed catch on one side, a stop catch on a back side, a round head at another end for mounting thereon of a torsion spring;

said torsion spring having one leg thereof hooking up to said stop catch;

a stop pin on the underside for hooking up thereto another leg of said torsion spring;

two channels on the top side of the upper housing, a shank upstanding between said two channels for mounting thereon of a knurl to be covered by a cover plate;

a left plate combination comprising a horizontal plate having a first toothed section on an inner side for engagement with said knurl, and a vertical plate being perpendicular to said horizontal plate and having two channels on opposite sides for insertion therein of an insert plate;

a right plate combination designed to be exactly the same as said left plate combination, but operating in an opposite direction;

a slide block comprising a base disposed between two prongs, said prongs each having a push button extended outward from a front end and connected thereto by a toothed member for engagement with each of said toothed portions on said upper housing respectively;

wherein said left and right plate combinations are movably inserted into the two channels on said upper housing respectively for adjustment in width, and with the movement of the insert plates for adjustment in thickness, and said slide block being movably inserted into said upper housing between said two guide blocks for adjustment in length.

2. An adjustable mobile phone holder as set forth in claim 1, wherein said toothed catch on said catch means is engaged with or disengaged from a second toothed section on said horizontal plate of said left plate combination for width adjustments by said catch knob on said catch means.

3. An adjustable mobile phone holder as set forth in claim 1, wherein said toothed members on said prongs of said slide block are engaged with or disengaged from said toothed portions on said guide blocks of said upper housing respectively for length adjustment by said push buttons on said prongs of said slide block.

4. An adjustable mobile phone holder as set forth in claim 1, wherein said lower housing further comprises a slot on the back at the center, and another plurality of screw holes for fixedly connecting with an external stand.

5. An adjustable mobile phone holder as set forth in claim 1, wherein said catch means comprises a thru-hole on said round head far insertion therein of said pivot pin, such that said catch means rotates about said pivot pin.

6. An adjustable mobile phone holder as set forth in claim 1, wherein said two channels on said vertical plate of said left plate combination have each a toothed section on a top end for engagement with a respective toothed section formed in said insert plate of said left plate combination on either side, and a tongue protruding from the center of the vertical plate for joint with a groove cut on said insert plate to limit the upper movement of said insert plate.

7. An adjustable mobile phone holder as set forth in claim 1, wherein said vertical plate and said insert plate of said right plate combination are exactly the same as said left plate combination.

8. An adjustable mobile phone holder as set forth in claim 1, wherein the rib disposed between said two guide blocks on said upper housing for inserting into a groove formed on said base of said slide block, so as to help said block move smoother.

9. An adjustable mobile phone holder as set forth in claim 1, wherein said horizontal plate of either said left or said right plate combination has a tip formed at one end adjacent to said first toothed section and acting as a stop to limit the horizontal movement thereof.

* * * * *